United States Patent [19]

Stellfox et al.

[11] 4,268,204
[45] May 19, 1981

[54] CONTINUOUS SHIP UNLOADER

[75] Inventors: Samuel K. Stellfox; Hermann Urban, both of Pittsburgh, Pa.

[73] Assignee: Dravo Corporation, Pittsburgh, Pa.

[21] Appl. No.: 24,991

[22] Filed: Mar. 29, 1979

[51] Int. Cl.[3] .............................................. B65G 63/00
[52] U.S. Cl. .................................... 414/139; 198/509; 198/511; 198/518; 212/195
[58] Field of Search .............. 198/307, 509, 518, 511, 198/587; 414/137, 138, 139, 140, 133, 209, 211, 313, 318, 394, 391, 392, 502–504; 212/262, 255, 258, 195, 261, 211

[56] References Cited

U.S. PATENT DOCUMENTS

| | | | |
|---|---|---|---|
| 3,392,818 | 7/1968 | Baschant | 414/139 X |
| 3,616,890 | 11/1971 | Pradon | 414/139 X |
| 3,640,376 | 2/1972 | Peuker et al. | 198/511 |
| 3,756,375 | 9/1973 | Briggs | 414/139 X |

FOREIGN PATENT DOCUMENTS

| | | | |
|---|---|---|---|
| 1233329 | 1/1967 | Fed. Rep. of Germany | 414/139 |
| 2523948 | 12/1976 | Fed. Rep. of Germany | 414/140 |

*Primary Examiner*—Frank E. Werner

*Attorney, Agent, or Firm*—Parmelee, Miller, Welsh & Kratz

[57] ABSTRACT

A continuous type of bucket unloader especially useful in transferring bulk cargo from a floating ship to shore has a main loading boom with an endless bucket chain pivotally suspended at its shipside end and which is pivotally mounted between its ends on a horizontal pivot on the shipside end of a lever which, in turn, is pivotally supported on a horizontal pivot between its ends on a support structure that, in turn, is fixed on a gantry. The landside ends of the boom and the lever are counterweighted and adjustably connected to each other whereby the angular relation of the boom to the lever on which it is mounted may be varied, and the lever, in turn, has a fluid pressure cylinder and piston unit for pivotally adjusting its angle relative to its support on the gantry. The combination provides a wide range of adjustment for the continuous bucket chain which, in turn, discharges bulk cargo that it elevates from the ship's hold to a fixed receiving chute on the gantry, and the arrangement tends to maintain a substantial condition of balance crosswise and lengthwise of the wheel bearings of the gantry trucks in all positions of the continuous bucket conveyor.

7 Claims, 3 Drawing Figures

CONTINUOUS SHIP UNLOADER

This invention is for bulk material handling and provides an unloader with an endless bucket elevator especially designed for the transfer of bulk material from the hold of a ship to a receiving means on shore from which it is discharged onto a conveyor belt or into a succession of cars by which it is transported to either a nearby or remote destination.

In the unloading of bulk material in large quantities from the hold of a ship to shore, it is not unusual to have some type of unloader mounted on a gantry to move along a wharf or dock area, to one side of which the bulk laden ship is moored with some type of continuous bucket unloader that may be lowered through a hatch in the deck of the ship and operated to continuously remove the bulk material from the ship's hold.

Ships vary in size in length, breadth and depth, and various problems are involved in accommodating unloaders to these conditions. Also, they are designed to remove large tonnages per hour, and shifting of the center of gravity over wide ranges presents a problem where, as is usually the case, the unloader is carried on a gantry and wide changes in the center of gravity shifts the load on the wheeled trucks or bogies, especially in raising and lowering the bucket unloader to a position to be clear of a ship, or in transferring the unloader from one hatch to another, or when the unloader is raised to remain idle, perhaps between times when it is not being actively used.

The present invention provides a structure adapted to the unloading of ships of various sizes where shifting of the center of gravity in various operating positions and between operating and idle positions is minimized and also provides an unloader where slewing (rotation about a vertical axis) or trolley arrangements usually necessary for bringing the digger closer or more distant from shore crosswise of the ship's hold are not required. It provides, moreover, a main boom with a conveyor that is so arranged that a fixed receiving hopper on the gantry and the discharge end of said conveyor will receive material being unloaded at any position of the boom. These and other improvements and advantages are secured with an unloader embodying our invention.

BRIEF DESCRIPTION

With the present invention the digging arm, which is generally vertical as is usual in unloaders of this type, has a digging wheel at its lower end and an endless bucket conveyor passing around the digging wheel to the top of the arm where the buckets are inverted. The material dumped from them is discharged onto a conveyor at the outer end of a main boom. This boom carries the material shoreward.

According to this invention, a digging arm is hung from a fixed pivot on the outer end of the boom. The boom, however, is pivotally mounted between its ends on the shipside end of a supporting lever. This lever, in turn, is pivotally mounted between its ends to pivot in a vertical arc on a fixed support on the bed of the gantry movable along a dock parallel with the length of the ship being unloaded. Carried in this manner, the shipside end of the boom with its digging arm may be moved in an arc relative to the lever on which it is mounted, or by rocking the said lever through a vertical arc without changing its position with reference to the lever in which it is mounted, or each may be moved relatively to the other at the same time.

With this arrangement, the shoreside end of the boom and the lever may both be counterweighted and these two ends are connected with a luffing cable by means of which the relation of the main boom to the lever on which it is carried can be adjustably fixed. In other words, the two independent counterweights operate in unison when the lever is moved, but the one on the boom counterbalances the boom independently of the one on the lever when the boom is rocked but the lever remains fixed.

One of the advantages of this arrangement is that the conveyor that transfers the material from the digger arm to shore may terminate adjacent its pivotal mounting on the lever into a fixed receiving hopper and transfer chute on the gantry, eliminating adjustable receiving conveyors extending from the shore side of the gantry; movement of the digging arm crosswise of the ship does not require a trolley, and the unloader readily accommodates itself to the unloading of ships of widely different sizes. Moreover, the weight on the gantry due to change in the center of gravity is largely minimized.

The invention may be readily understood by reference to the accompanying drawings illustrating a preferred embodiment of the invention, in which.

Figure 1:
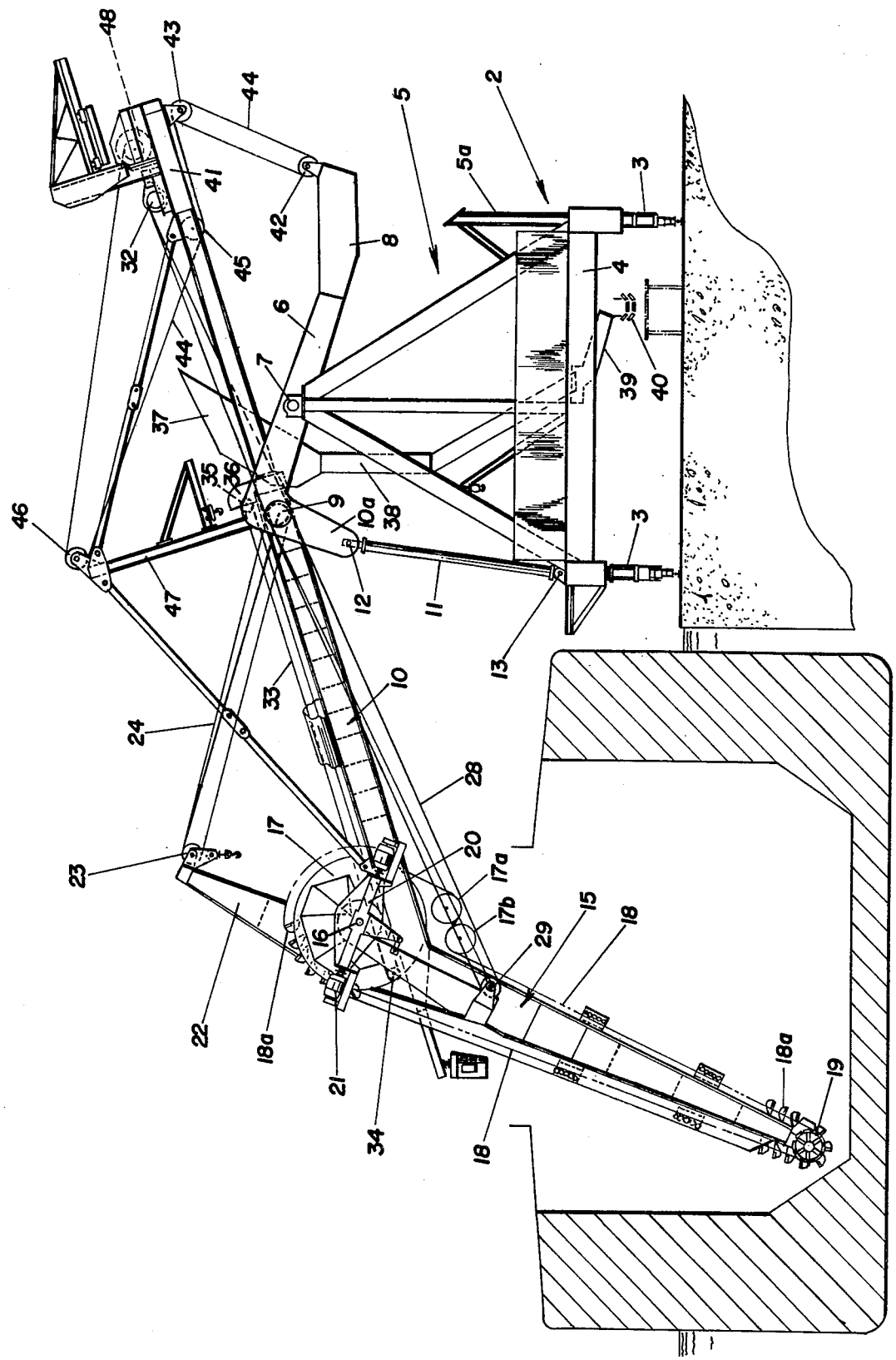
FIG. 1 is a general arrangement drawing showing in side elevation a continuous unloader mounted on a gantry for travel along an unloading dock, with the hull of a bulk cargo carrier outlined in transverse section alongside the dock, the digging arm being shown in unloading position near the bottom of the hull at the offshore side of the dock.
Figure 2:
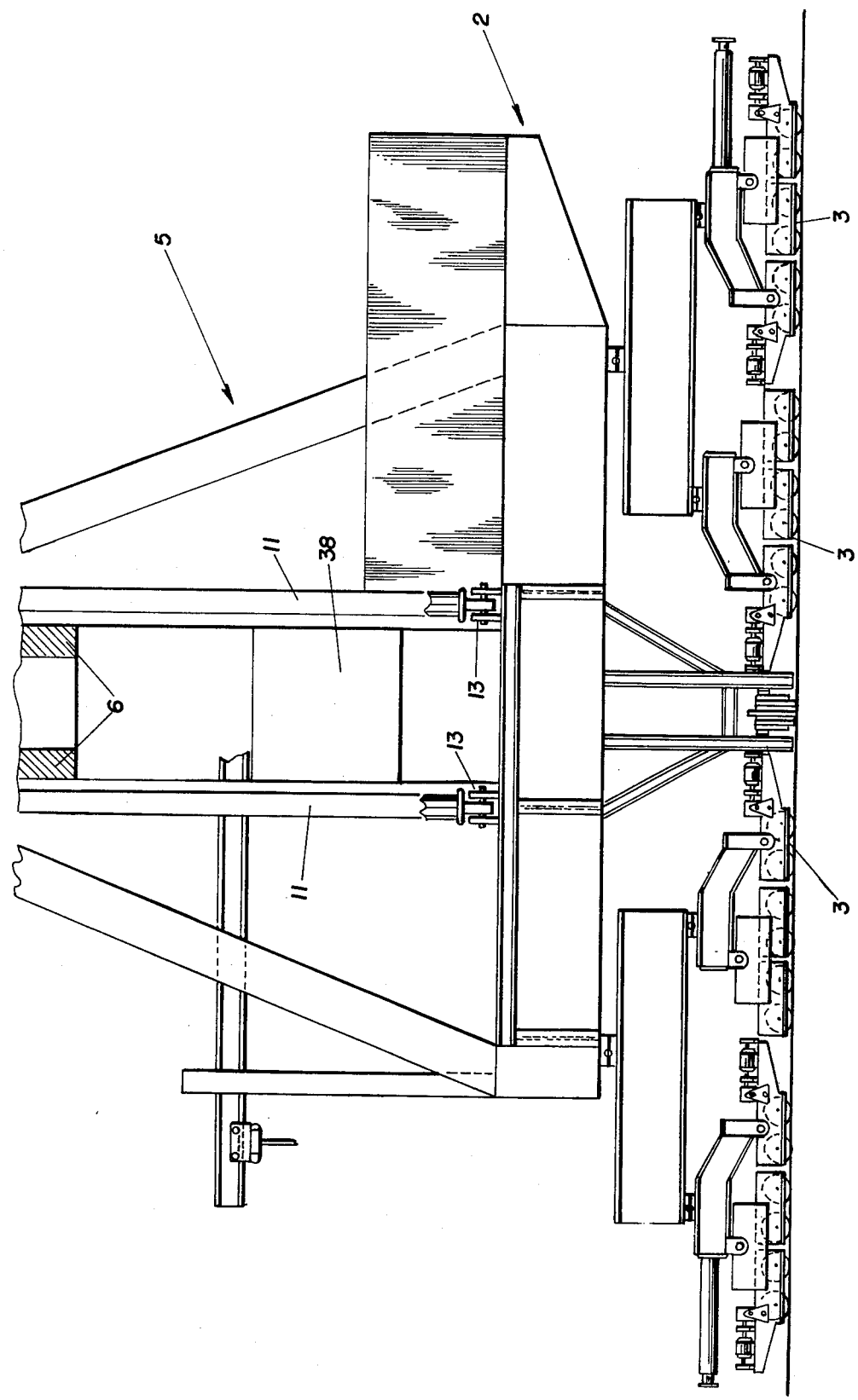
FIG. 2 is a fragmentary elevation of the structure shown in FIG. 1 at right angles to FIG. 1.

The structure shown in the drawings is designed for unloading a ship at the rate of 2500 metric tons per hour, assuming the cargo to be iron ore, but the rate will vary, of course, with the bulk density of the material being unloaded, and this figure is mentioned only because the drawings give no concept of the magnitude of such structure.

The unloader, in general, comprises a gantry 2 supported on wheeled electrically driven trucks or bogies 3 in a usual manner. There is a platform designated generally as 4 with a structural frame. This frame carries a rigid, vertically extending superstructure 5 comprising a pair of spaced inverted V-shaped or modified A-frames. Between the apexes of these frames there is pivotally supported a pivot arm structure 6 comprising two spaced parallel levers carried on a main pivot pin 7 at the top of the superstructure 5. These levers carry at their shoreside ends a pivot arm counterweight 8 connecting the two levers. At their shipside ends, the lever assembly, comprising the two levers, counterweight, etc., is termed the "pivot arm", while the individual levers are called the "pivot arm levers." The pivot arm supports a transverse boom hinge pin 9 on which is carried the main boom 10.

The shipside ends of the pivot arm levers have depending extension or arms 10a. Means is provided for rocking or luffing the pivot arm structure on its main pivot pin 7. Preferred means for controllably luffing the pivot arm comprises a pair of matching hydraulic jacks 11, which function as a single unit, each jack having a piston pivotally connected at 12 to one of the depending extensions 10a of the pivot arm levers and each having its cylinder pivotably anchored to the gantry frame at 13. By operating the jacks to extend or retract their pistons, the pivot arm may be luffed and held at a selected angle within the operating range of the jacks.

The pivot pin 9 for the main boom 10 is intermediate to the ends of the boom at a location well toward but not at the center of the boom and may be rocked in a vertical arc about its hinge pin 7. Thus, the boom being pivoted at the shipside end of the pivot arm has a range of compound movments in a common vertical plane.

The shipside end of the boom 10 has a digging arm assembly 15 pivotally suspended therefrom. The digging arm pivot point 16 comprises the drive shaft for two large spaced sprockets 17 one of which is spaced behind the other on a common axis which is transverse to the plane of the longitudinal axis of the boom, the sprocket wheels themselves being in planes parallel with the plane of said longitudinal axis so that only one of which is seen in the drawing. Parallel chains 18 pass over and are driven by these sprockets, but here also only one chain 18 can be seen and is here indicated by a broken line. Between the chains is a continuous succession of digging buckets 18a providing a digging and elevating conveyor of a type well known in the art, but because of the small scale of the drawings, only a relatively few of these buckets are shown. The buckets are seen only in end elevation because they extend ladder-like between the two chains and cross-wise of the long axis of the boom, and which, in fact, is known in the art as a bucket ladder. At the lower end of the digging arm the chains carry the buckets from the down reach of their travel around digging sprocket assembly 19 in a direction to scoop up the bulk material which they encounter and carry it up the other side of the digging arm to be discharged as the buckets pass around the top of the sprocket wheel 17. The sprocket chains starting their descent from the drive wheels pass around take-up sprockets 17a and 17b. A gear reducer 20 is mounted on the shaft 16 and this reducer includes oppositely extending supports for drive motors 21 for driving the sprockets 17 and digging and elevator conveyor, as is well understood in the art. Usual brakes, also well known in the art, can be arranged on the reducer to prevent reverse travel of the digging conveyor when the motors are stopped.

Figure 3:
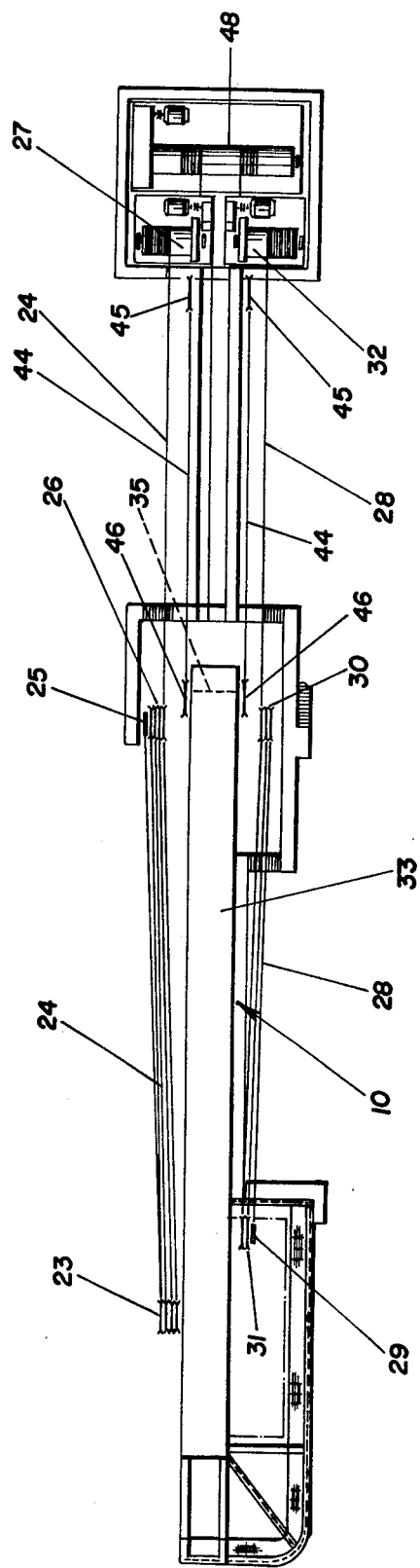
FIG. 3 is a generally schematic outline view of the main boom as seen from the top with the digging arm and drive omitted and illustrating mainly the several cable arrangements.

The digging arm has an upwardly projecting extension 22 on which there are sheaves 23, here indicated to be four in number. A cable 24 anchored at 25 at the axis of the boom is reeved around these pulleys and around a similar number of sheaves 26 (see FIG. 3) also at this axis, and then extend to a power-driven drum 27 near the inshore end of the boom. A similar cable 28, anchored to the digging arm at 29 is reeved around sheaves 30 on the boom axis and around sheave 31 on the digging arm beside the cable anchor 29, with the other end of the cable so reeved to extend along the boom to a power-driven drum 32.

The cable 24 and its reeving system are referred to herein as the "digging arm extension rope" and "extension rope reeving system." The other cable 28 is referred to as the "digging arm retracting rope" and, with its sheaves, is termed the "digging arm retracting rope reeving system." Driving the drum 32 to take up on the digging arm retracting rope 28 while slacking off on the digging arm extension rope swings the lower end of the digging arm shoreward, or to the right as viewed in FIG. 1. Taking up on cable 24 and paying out retracting rope 28, of course, swings the lower end of the digging arm in the reverse direction.

It has heretofore been mentioned that the buckets passing around the tops of the drive sprocket discharge the bulk material which they have elevated from the ship's hold. There is an endless conveyor belt 33, indicated by the parallel broken lines, extending along the boom from a terminal pulley 34 near the outer or left end of the boom to a pulley 35 generally above and a short distance to the right of the boom pivot hinge 9. Bulk material falling from the buckets as they pass around the top of the drive sprockets 17 is received at the outer end of this conveyor belt and discharged over the said pulley 35.

The pulley 35 is located at the mouth of a receiving chute 36 fixed on the boom at the right of the boom hinge pin. The lower end of the chute is positioned to discharge the bulk material at any angle to which the boom may be positioned in unloading material into an open-topped hopper 37. The top of this hopper extends upwardly through the boom, as shown in FIG. 1, when the end of the boom in which the digging arm is carried is near its lowest position. The hopper 37 has a discharge chute 38 extending through the gantry platform to discharge into a receiving conveyor 40 on the dock below the gantry platform. However, other means for receiving the bulk material may be provided, as will be readily understood by those skilled in the art.

The inshore end of the boom is provided with a counterweight 41 and also carries certain power-driven winches including the rope drums 27 and 32 heretofore mentioned. There is a multi-fall rope luffing connection between the counterweighted ends of the boom and the pivot arm, the sheaves on the pivot arm being designated 42 and those on the boom designated 43. The rope 44, after passing over the last sheave 43 on the boom, extends forward to guide sheave 45, then upwardly to the sheave 46 on the top of mast 47. The mast 47 is perpendicular to the axis of the boom hinge pin 9. From the sheave 46, this luffing rope extends to a power-operated drum 48 at the shoreside end of the boom. In this manner, the angular relation between the boom and the pivot arm can be changed.

In the operation of the unloader it must be taken into consideration that, as the cargo is removed from the ship, the hull becomes more buoyant, bringing the floor of the cargo compartment closer to the digging sprocket. In FIG. 1 of the drawings, the pivot arm 6 is at its closet approach to a horizontal position since, as here shown, the hydraulic jacks 11 for tilting the arm are shown fully collapsed. At this time the boom 10 may be near its greatest operating angle of forward tilt, that is, between 15 and 20 degrees to the horizontal, which is generally the steepest angle for handling bulk materials on inclined conveyors. At this time the digging arm pivot 9 is near the outermost limit of its arc of travel in a horizontal direction from and at a level above the main hinge pin 7 at the top of the pivot arm supporting frame 5. If the pivot arm jacks are extended, the digging arm will be lifted and may then be tilted at a reverse angle to that shown to remove material from the hold at the dockside of the ship. If the arc of movement of the pivot arm is considered as part of a clock face with the pivot 7 as the center, the arc of movement of the pivot 9 is in the 9 to 12 hour-hand range but perhaps somewhat less than the full sweep of that arc.

For the digging arm to clear the superstructure of the ship, the luffing rope or cable 44 may be operated to bring the shoreside end of the boom down close to parallelism with the pivot arm, bringing the two counterweights 8 and 41 closer together, and the pivot arm 5 may then be tilted to bring its shoreside end down and deposit counterweight 41 onto a fixed support 5a on the gantry. This will raise the digging arm well out of the hold and allow it to be swung in to hang nearly vertically from the boom over the left side of the gantry platform. As the digging arm is rocked in this manner to raise the digging arm closer to the superstructure, the counterweights 8 and 41 on the pivot arm and boom, respectively, also move more closely into line with said vertical axis of the gantry, thus keeping the balance and center of gravity more nearly uniform at all times. Reversely, as the boom and digging arm and the pivot arm move to bring the digging arm to an operating position, as shown in FIG. 1, the counterweights 8 and 41 swing out from the vertical center of the gantry to more effectively counteract the weight of the loading end of the boom and its digging arm.

With this arrangement it is unnecessary to slew the digging arm and connected parts about a vertical axis to work the digging arm close to the shoreside of the hold.

Certain accessories, such as means for lifting, lowering and transporting a bulldozer on the gantry, have not been shown and other accessory equipment has been omitted, all motors and winches and control equipment being conventional. An operator's cab has been indicated at the outer or shipside end of the boom.

In the specification and in the following claims, instead of using the terms "left" and "right" of some point of reference, we have used the term "shipside" to designate that direction from the point of reference which is toward the ship to be unloaded and the term "landside" to indicate the direction opposite "shipside". These terms are commonly used in the art and are apt whether one is facing the unloader from upstream or downstream of the point of reference, and they are to be so understood in the specification and claims.

We claim:

1. In a continuous unloader of the type especially useful for transferring bulk cargo from the hold of a ship positioned alongside the unloader to shore, the unloader comprising a gantry movable on a track generally parallel with a ship positioned alongside the track for unloading, the gantry having a vertical support mounted thereon, the invention wherein:
    (a) there is a lever pivotally mounted between its ends on the support for movement in a vertical arc with one end extending toward the shipside of the track and the other end disposed on the opposite or landside of the track, the landside of the lever having a counterweight thereon;
    (b) a boom pivotally supported between its ends on the shipside end of said lever for movement on the lever about an axis parallel with the pivotal axis of the lever on the support whereby the boom will be moved with the lever on which it is carried when said lever is rocked about its pivotal axis and which also may be rocked about its own pivotal axis on the shipside end of the lever;
    (c) means arranged for controllable rocking and holding of the lever in an adjusted position relative to the gantry and means arranged for controllably adjusting the boom about its pivotal axis on the lever and holding it in adjusted position relative to the lever;
    (d) a digging arm pivotally suspended from the shipside end of the boom for movement in an arc crosswise of the hold of a ship being unloaded;
    (e) means arranged to controllably effect said arcuate movement of the digging arm relative to the boom;
    (f) said lever and boom being movable through an operating range where the digging arm may enter and be moved crosswise of the ship's hold and be lowered and raised relative to said hold as required to remove material from the hold to an inoperative position where the digging arm hangs vertically clear of the ship and closer inshore toward the gantry;
    (g) a counterweight on the landside end of the boom, the arrangement thereby assuring that as the shipside ends of said lever and boom are raised to lift the digging arm clear of the ship and move it inwardly toward the gantry, the respective counterweights on the lever and boom will swing inwardly toward the support to maintain the center of balance close to the vertical center line of the support; and
    (h) the digging arm having a continuous elevating conveyor arranged to gather bulk material at its lower end when it is in operating position and discharge said bulk material at its upper end, the boom having a conveyor arranged to receive bulk material from the upper end of the elevating conveyor when it is in operating position and discharge it at any angle in its operating range to fixed receiving means on the gantry.

2. A continuous unloader as defined in claim 1 wherein the means for rocking the lever and its support comprises at least one hydraulic jack positioned on the gantry and operatively connected with the boom supporting end of the lever.

3. A continuous unloader as defined in claim 1 wherein the means for rocking the boom relative to the lever on which it is pivoted comprises a winch operated sheaves and cable connection between the landside ends of the lever and boom.

4. A continuous unloader as defined in claim 3 wherein the means for moving the digging arm relative to the boom end on which it is pivotally hung comprises a motor-operated winding drum and cable system on the boom with a pair of cables, on cable of which unwinds from the drum simultaneously as the other cable winds about the drum, the digging arm having opposed cable attaching terminals radially offset from the pivotal axis of the digging arm, to each one of which one only of said two cables is anchored.

5. A continuous unloader as defined in claim 4 in which the winch for operating the sheave and cable connection for rocking the boom and motor-operated drum means of the winding drum and cable system are carried on the landside end of the boom as part of the counterweight on said end of the boom.

6. A continuous bucket unloader for removing bulk cargo from ships successively positioned alongside the unloader, wherein there is a supporting platform alongside of which a ship to be unloaded may be positioned and means is provided for effecting relative longitudinal movement of the platform and the ship, said unloader comprising:
    (a) a vertical support on the platform;

(b) a lever pivotally mounted between its ends on said support for movement in a vertical arc transverse to the length of a ship which is in position to be unloaded;

(c) a boom pivotally supported between its ends on the shipside end of the lever for movement in a vertical plane substantially the same as the plane of movement of said lever on which it is pivotally carried and having a counterweight on the landside end thereof outwardly from the support;

(d) said boom having a digging arm pivotally suspended at its shipside end to swing about a horizontal axis in an arc crosswise of the length of said ship, the digging arm having a continuous chain and bucket elevating conveyor thereon with upwardly and downwardly moving flights of buckets, both of which are in the same vertical plane as the planes in which the boom and lever swing, with the buckets being crosswise of the longitudinal axis of the boom arranged to gather bulk material at the lower end of the digging arm and discharge it adjacent the upper end of the arm;

(e) the boom having a material transfer conveyor thereon arranged to receive bulk material so elevated and discharged by the elevator conveyor;

(f) receiving means on the platform intermediate the ends of the boom arranged to receive material from said transfer conveyor in any angle of the boom relative to said platform and support to which the boom may be moved during the unloading of a ship;

(g) means for rocking the lever on its support and holding it in the adjusted position, and luffing means arranged to controllably adjust the angular relation of the boom about its pivot relative to the lever; and (h) means for controllably adjusting the digging arm about said horizontal axis and holding it in adjusted position.

7. A continuous bucket unloader as defined in claim 6 wherein said receiving means on the platform comprises a hopper located at all times when the bucket elevator is in an operating position between the pivotal mounting of the boom on the lever and the pivotal mounting of the lever on the support, the hopper having an open top elongated in the direction of the length of the boom, with the hopper increasing in height from its lower edge adjacent the pivot for the boom on the lever when the pivot for the boom is at lowest level in its arc of travel on the lever to its highest level above and to the rear of the pivot for the lever on the support whereby the hopper may receive bulk material from the transfer conveyor in the entire range of movement in which said conveyor may operate by reason of the boom being so mounted on the lever which in turn is mounted on the boom.

* * * * *